United States Patent Office 3,454,575
Patented July 8, 1969

3,454,575
QUATERNARY 5-AMMONIUM-METHYL-4-AMINO-2 CYCLOALIPHATYLPYRIMIDINE SALTS
Renat Herbert Mizzoni, Long Valley, and George de Stevens, Summit, N.J., assignors to Ciba Corporation, New York, N.Y., a corporation of Delaware
No Drawing. Continuation-in-part of application Ser. No. 592,314, Nov. 7, 1966. This application Mar. 6, 1967, Ser. No. 620,626
The portion of the term of the patent subsequent to May 28, 1985, has been disclaimed
Int. Cl. C07d 51/42; A01n 9/22
U.S. Cl. 260—256.4                                      7 Claims

ABSTRACT OF THE DISCLOSURE

Quaternary 5 - ammoniummethyl - 4 - amino-2-cycloaliphatlypyrimidine salts of the Formula I

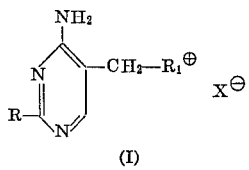

(I)

R=cycloalkyl, cycloalkenyl, cycloalkylalkyl and cycloalkenylalkyl
$R_1^\oplus$=ammonium group of which the nitrogen atom is part of a heterocyclic radical
$X^\ominus$=anion of an acid and acid addition salts thereof, e.g. the 2-cyclopropyl or cyclopropylmethyl - 4 - amino-5-(2-methyl-pyridinium)-methyl-pyrimidine chloride hydrochlorides, exhibit anticoccidial effects.

CROSS-REFERENCES TO RELATED APPLICATIONS

This is a continuation-in-part of application Ser. No. 592,314, filed Nov. 7, 1966, now U.S. Patent No. 3,385,-857, which in turn is a continuation-in-part of application Ser. No. 572,671, filed Aug. 16, 1966, which in turn is a continuation-in-part of application Ser. No. 534,666, filed Mar. 16, 1966, which in turn in a continuation-in-part of application Ser. No. 493,233, filed Oct. 5, 1965, and now abandoned.

SUMMARY OF THE INVENTION

The present invention concerns and has for its object the provision of new quaternary 5-ammoniummethyl-4-amino-2-cycloaliphatyl-pyrimidine salts, more particularly those of Formula I, in which R stands for cycloalkyl, cycloalkenyl, cycloalkyl-lower alkyl, cycloalkenyl-lower alkyl or any such radical substantituted by lower alkyl groups, halogen atoms and/or etherified hydroxy or mercapto groups, $R_1^\oplus$ for an ammonium group of which the nitrogen atom is part of a 5- or 6-rings-membered monocyclic heterocyclic radical or an 8- to 10-ring-membered bicyclic heterocyclic radical containing up to 3 hetero atoms and at least one double bond extending from the ammonium nitrogen, and $X^\ominus$ for the anion of an acid, and acid addition salts thereof, corresponding veterinary compositions, feedstuffs and feedstuff additives, as well as methods for the preparation of these products. Said compositions, feedstuffs or drinking water containing the compounds of the invention alone, or in combination with other thereapeutically valuable agents, are useful in the control of coccidiosis, which is one of the most important goals in the poultry raising industry.

DESCRIPTION OF THE PREFERRED EMBODIMENTS

A cycloalkyl or cycloalkyl-lower alkyl radical representing R, more particularly contains 3 to 8 ring-carbon atoms and preferably stands for cycloalkyl, (lower alkyl)-cycloalkyl, cycloalkyl-lower alkyl or (lower alkyl)-cycloalkyl-lower alkyl with 3 to 6 ring-carbon atoms and up to 4 lower alkyl groups. These (referred to above and hereinafter) contain up to 7, preferably up to 4 carbon atoms. Such radicals are exemplified by cyclopropyl, 2-methyl - cyclopropyl, 2,2- or 2,3 - dimethyl - cyclopropyl, 2,2,3,3 - tetramethyl - cyclopropyl, 2 - ethyl-cyclopropyl, cyclobutyl, 2,2,3-trimethyl-cyclobutyl, 3-ethyl-cyclobutyl, cyclopentyl, 2- or 3-methyl-cyclopentyl, 2,5- or 3,4-dimethyl-cyclopentyl, cyclohexyl, 2-, 3- or 4-methyl-cyclohexyl, 2,3-, 2,4- or 3,5-dimethyl-cyclohexyl, 2,4,6-trimethyl-cyclohexyl, cycloheptyl or cyclooctyl or the group $R_2$-alk- in which the lower alkylene portion alk separating the cycloalkyl group $R_2$ (e.g. one of the above defined radicals) from the 2-positon of the pyrimidine nucleus, preferably has 1 to 4 carbon atoms and especially represents methylene, but also 1,1- or 1,2-ethylene, 1,1-, 1,2-, 2,2- or 1,3-propylene, 2-methyl-1,3-propylene, 1,1-, 1,2-, 2,2-, 1,3- or 1,4-butylene. A cycloalkenyl or cycloalkenyl-lower alkyl group R has at most 2 double bonds and, more particularly, contains 3 to 8 ring-carbon atoms. It preferably stands for cycloalkenyl, (lower alkyl)-cycloalkenyl, cycloalkenyl-lower alkyl or (lower alkyl)-cycloalkenyl-lower alkyl with 5 to 6 ring-carbon atoms, such as 2-cyclopropenyl, 1- or 2-cyclopentenyl, 2,4-cyclopentadienyl, 2- or 3-methyl-2-cyclopentenyl, 4,5-dimethyl-2-cyclopentenyl, 1-, 2- or 3-cyclohexenyl, 2,5-cyclohexadienyl, 2-, 3- or 4-methyl-1- or 2-cyclohexenyl, 2,4- or 3,5-dimethyl-1- or 2-cyclohexenyl, 2,4,6-trimethyl-2,5-cyclohexandienyl, 1-, 2- or 3-cycloheptenyl, 2,6-cycloheptadienyl or 2-cyclooctenyl or the group $R_3$-alk-, in which alk has the above given meaning and $R_3$ is one of the above defined cycloalkenyl radicals. The above cycloaliphatic radicals may additionally be substituted, preferably in the ring, but also in the alk chains, by one or more than one halogen atoms, such as fluoro or chloro, or etherified hydroxy or mercapo groups, such as lwer alkoxy or lower alkylmercapto, e.g. methoxy, ethoxy, n- or i-propoxy or -butoxy; methyl- or ethylmercapto.

The ammonium group $R_1^\oplus$ represents especially a pyridinium, but also a quinolinium, isoquinolinium, pyridazinium, pyrimidinium, pyrazinium, quinazolinium, phthalazinium, 1,5-, 1,6-, 1,7- or 1,8-naphthyridinum, N-lower alkyl-N'-pyrazolium, N-lower alkyl-N'-imidazolium, thiazolium, oxazolium, 1,3,5-triazinium, 1-lower alkyl-1H-pyrrolo [3,2-b]pyridinium, 6-lower alkyl-6H-pyrrolo-[3,4-b]pyridinium, thieno[3,2-b]pyridinium, thieno[2,3-b]pyridinium, pyrido[3,2-b]pyrimidinium or pyrido[2,3-b]pyrazinium radical, or a partially hydrogenated derivative thereof, such as a pyrazolinium, N-lower alkyl-N'-pyrazolinium, imidazolinium, N-lower alkyl-N'-imidazolinium, thiazolinium or oxazolinium radical. It is unsubstituted or substituted by one or more than than one of the same or of different substituents, for example, lower alkyl groups, such as those mentioned above, free or functionally converted hydroxy or mercapto groups, such as lower alkoxy or alkylmercapto, e.g., that mentioned above, halogen, e.g., fluoro, chloro or bromo, trifluoromethyl or amino, especially di-lower alkylamino, e.g., dimethylamino or diethylamino.

The anion $X^\ominus$, as well as the acid addition salts mentioned in the beginning, are preferably derived from therapeutically useful inorganic or organic acids, especially hydrohalic acids, e.g. hydrochloric or hydrobromic acid, but also, for example, sulfuric, phosphoric, nitric or perchloric acid, aliphatic, alicyclic, aromatic or heterocyclic carboxylic or sulfonic acids, such as formic, acetic, propionic, succinic, glycollic, lactic, malic, tartaric, citric, ascorbic, maleic, hydroxymaleic, pyroracemic, phenylacetic, benzoic, p-aminobenzoic, anthranilic, p-hydroxybenzoic, salicylic, p-aminosalicylic, embonic, methanesulfonic, ethanesulfonic, hydroxyethanesulfonic, ethylenesulfonic, halobenzenesulfonic, toluenesulfonic, naphthalenesulfonic or sulfanilic acid, methionine, tryptophane, lysine or arginine.

The compounds of this invention possess valuable pharmacological properties. For example, they exhibit antiprotozoal activity, especially against parasites causing coccidiosis, such as *Eimeria tenella, acervulina, adenoides, agridis, brunetti, hagani, maxima* and *necatrix*. This can be demonstrated, for example, by the curative effect of a feed, containing about 0.0001 to about 0.02% of the compounds of this invention, given to chickens one or two days prior till 8 days after their inoculation with sporulated oocysts of the above listed Eimeria species. The curvative effect can also be demonstrated at doses between about 0.001 to 0.02% applied after inoculation with said oocysts. Besides the above mentioned utility, the compounds of this invention are also useful intermediates in the manufacture of other valuable products, particularly of pharmacologically active compounds.

Particularly useful are compounds of the formula

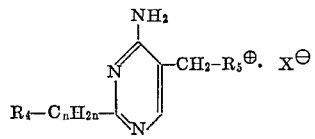

in which $R_4$ stands for cycloalkyl, (lower alkyl)-cycloalkyl, (lower alkoxy)-cycloalkyl or (halo)-cycloalkyl with 3 to 6 ring-carbon atoms, $n$ for the integer 0 or that from 1 to 4, $R_5^\oplus$ for pyridinium, quinolinium, isoquinolinium, pyridazinium, pyrimidnium, pyrazinium, thiazolium, thiazolinium, oxazolium, oxazolinium, imidazolium, imidazolinium or such radical substituted by up to 2 lower alkyl groups, and $X^\ominus$ for the anion of an acid, and acid addition salts thereof.

Of special value are compounds of the formula

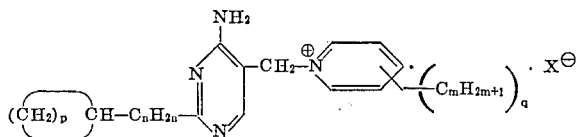

in which $p$ stands for an integer from 2 to 5, $n$ for the integer 0 or that from 1 to 2, $m$ for an integer from 1 to 4, $q$ for an integer from 0 to 2, and $X^\ominus$ for the anion of an acid, and acid addition salts thereof.

Especially mentioned are the 5-(2,4-dimethylpyridinium) - methyl - 4 - amino - 2 - cyclopropyl-, cyclopentyl-, cyclopropyl - methyl, or cyclobutyl - methyl - pyrimidine chloride hydrochloride and the 5-(2-methyl-pyridinium)-methyl - 4 - amino - 2 - cyclopropyl-, cyclopentyl-, cyclopropylmethyl- or cyclobutylmethyl-pyrimidine chloride hydrochloride which, when given with the feed to Eimeria infected chicken in an amount between about 0.0001 to 0.02%, show an outstanding curative effect.

The compounds of the invention are prepared by methods in themselves known. Advantageously they are obtained by reacting a reactive ester or ether of a 5-hydroxymethyl - 4 - amino - 2 - cycloaliphatyl-pyrimidine with a corresponding mono- or bicyclic heterocylic compound containing at least one ring-nitrogen atom and double bond, and/or converting a quaternary 5-ammonium-methyl - 4 - amino - 2 - cycloaliphatyl-pyridimine base or pseudobase into its quaternary salt and/or, if desired, converting a resulting free 4-amino-compound into its acid addition salt or converting a resulting acid addition salt into a free 4-amino-compound or into another salt and/or converting a resulting quaternary salt into another quaternary salt.

A reactive ester of said 5-hydroxymethyl compound is, for example, that of a strong inorganic or organic acid, such as a hydrohalic, sulfuric, sulfonic or carbamic acid, e.g. hydrochloric, hydrobromic, sulfuric or lower alkyl sulfuric acid, a lower alkane or benzene sulfonic acid, e.g. methane, ethane, benzene or p-toluene sulfonic acid, or unsubstituted or N-substituted carbamic acid, e.g. N,N-dimethyl- or N-phenylcarbamic acid. An ether of said 5-hydroxymethyl compound is preferably a lower alkyl or phenyl-lower alkyl ether, e.g. the methyl, ethyl, isopropyl or benzyl ether. The quarternary base or pseudobase may contain hydroxy as an anion or as substituent of the heterocyclic ring containing the ammonium nitrogen. Advantageously the esters of the 5-hydroxymethyl compound are reacted in the form of their acid addition salts with the free heterocyclic compound, whereas the corresponding ethers are reacted in the free form with an acid addition salt of the heterocyclic reagent.

The compounds of the invention are obtained in the free form, i.e. that having a free 4-amino group, or in the form of their acid addition salts, depending on the conditions under which the process is carried out; these salts are also included in the present invention. Acid addition salts that are obtained can be converted into the free compounds in known manner, for example, with weak alkalies, e.g. alkali metal carbonates or bicarbonates, or into other salts, for example with ion exchangers. Free compounds that are obtained, as well as the quaternary bases or pseudobases, can be converted into acid addition salts or quaternary salts respectively, by reacting them with inorganic or organic acids, especially those that are suitable for the formation of therapeutically useful salts, for example those listed for the anion $X^\ominus$. The transquaternization is carried out in the usual manner, advantageously with an excess of the corresponding heterocyclic base.

The above reactions are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

The invention further includes any variant of the present process in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the reactive ester of the 5-hydroxymethyl compound, e.g. a sulfonic acid ester, is advantageously formed under the reaction conditions, i.e. in the presence of the heterocyclic compound. Mainly those starting materials should be used in the reactions of the invention that lead to the formation of those compounds indicated above as being especially valuable.

The starting materials are known, or if they are new, may be prepared by methods in themselves known. Thus, for example, the 5-hydroxymethyl-4-amino-2-cycloaliphatyl-pyrimidines may be prepared by reacting a cycloaliphatic-lower alkanoic acid amidine or imido ester with a lower alkoxy-methylene-malodinitrile, reducing the resulting 5 - cyano - 4 - amino - 2 - cycloaliphatyl-pyrimidine to the corresponding 5-amino-methyl compound, for example with catalytically activated hydrogen, and converting it into the corresponding 5-hydroxy-methyl compound, for example by the action of nitrous acid. Said alcohol can be reactively esterified or etherified according to known methods, for example with a thionylhalide or phosphorus halide, a sulfuric or sulonic acid halide, e.g. sulfuryl, tosyl or brosyl chloride. A 5-halomethyl compound obtained may then be reacted with an anhydrous alcohol or mercaptan in order to obtain the desired ethers. The latter may also be prepared by reacting an acid addition salt of a cycloaliphatic-lower alkanoic acid amidine with an α-alkoxymethylene-β-alkoxy-propionitrile. The quaternary bases or pseudobases may be obtained by reduction of the corresponding oxo-compounds, i.e. the cyclic amides, for example with the use of complex light metal hydrides, such as lithium aluminum hydride or sodium borohydride.

The compounds of the invention can be used, for example in the form of veterinary compositions, animal feedstuffs or additives to feedstuffs, which are a further object of the present invention. The former contain said compounds in conjunction or admixture with inorganic or organic, solid or liquid pharmaceutical excipients suitable especially for enteral administration. Suitable excipients are substances that do not react with the compounds of the invention, for example water, gelatine, gums, sugars, e.g. lactose, glucose or sucrose, starches, e.g. corn starch or arrowroot, stearic acid or salts thereof, e.g. magnesium or calcium stearate, talc, alcohols, e.g. stearyl or benzyl alcohol, propylene glycol or polyalkylene glycols, alginic acid and other known medicinal excipients. The compositions may be, for example, tablets or pills, e.g. micropills, or in liquid form as solutions, suspensions or emulsions. They may be sterilized and/or contain adjuvants such as preserving, stabilizing, wetting or emulsifying agents, solution promoters, salts for regulating the osmotic pressure or buffers. They are prepared by conventional methods and contain about 0.1 to 75% more particularly 1 to 50%, of the active ingredient.

The feedstuffs and additives for feedstuffs or for the drinking water contain the compounds of the invention together with cvonventional extenders, diluents and/or nutrients, such as sucrose, glucose, molasses, fermentation residues, cornmeal, ground and rolled oats, wheat shorts and middlings, meat scrap, oil cake, soybean and fish meal, alfalfa, clover, grass clippings and the like, mineral supplements, such as bone meal, calcium carbonate, iodized salt and the like, vitamins, such as vitamins A, B, C and D and other suitable substances, such as preservants, e.g. benzoic acid. They contain the compounds of the invention in an amount ranging between about 0.0001 and 0.1%, preferably between about 0.001 and 0.02%, whereas the additives may contain the pure substances, when used, for example, for the drinking water, but usually contain between about 1 and 50% thereof. The amount of the compounds of the invention administered via the veterinary compositions or the drinking water corresponds to that given with the medicated feedstuffs shown above. The veterinary compositions, feedstuffs and additives may contain other therapeutically valuable substances, for example, sulfonamides, especially N'-(6 - chloro - 2 - pyrazinyl)-sulfanilamide, or N'-(2-quinoxalinyl)-sulfanilamide, but also N' - (2,6 - dimethoxy - 4 - pyrimidyl) - sulfanilamide, N' - (5 - ethyl - 1,3,4 - thiadazol - 2 - yl) - sulfanilamide, N' - (5 - methyl - 3 - isoxazolyl) - sulfanilamide, N' - (6-methoyl-3-pyridazinyl)-sulfanilamide and the N'-acetyl derivative thereof, N'-(4-methyl-2-pyrimidinyl)-sulfanilamide, N' - (2.6 - dimethyl - 4 - pyrimidinyl) - sulfanilamide, N' - (5 - methyl - 1,3,4 - thiadazol - 2 - yl)-sulfanilamide, N' - (6 - chloro - 3 - pyridazinyl) - sulfanilamide and the sodium salt thereof, N'-(2-phenyl-3 - pyrazolyl) - sulfanilamide, N' - (2 - phenyl - 5 - methyl-3-pyrazolyl)-sulfanilamide and the like. Sulfonamides of the type mentioned above can be used in approximately one-fifth to one-half of the amount effective as an antibacterial. In addition, the compositions, feedstuffs and additives of the invention may contain antibiotics, e.g. penicillin, streptomycin, aureomycin, terramycin, tetracyclin and the like, antiparasitic agents, e.g., methyl-4 - acetamino - 2 - ethoxy - benzoate, 2 - amino - 5 - nitro - thiazole, 1 - (5 - nitro - thiazolyl - 2) - 2 - oxo- tetrahydroimidazole, 6,7-dialkoxy- or cycloaliphatoxy-4-hydroxy-3-quinolinecarboxylic acids or their lower alkyl esters and/or transquilizers, such as reserpine, methyl 18-epi-O-methyl-reserpate, meprobamate and the like.

The following examples illustrate the invention; temperatures are given in degrees centigrade and all parts wherever given are parts by weight. The Amberlite IRA–400 resin, to which reference is made below, is a strong basic quaternary ammonium ion exchange resin of the type covered in U.S. Patent No. 2,591,573.

EXAMPLE 1

2.2 g. 5-hydroxymethyl-4-amino-2-cyclopropylmethyl-pyrimidine are dissolved in 15 ml. of freshly distilled 2,4-lutidine, and to this solution 2.24 g. of p-toluenesulfonyl chloride are added. The mixture is allowed to stand at room temperature for 4 days. It is then diluted with diethyl ether to yield a precipitate of which the supernatant solution is decanted. The residue is dissolved in isopropanol and the product 4 times precipitated with diethyl ether until the odor of 2,4-lutidine disappears. The crystalline 5-(2,4 - dimethyl - pyridinium)-methyl-4-amino-2-cyclopropylmethyl-pyrimidine salt is dissolved in 100 ml. water and the solution is passed through an Amberlite IRA–400 resin column present in the chloride form. The aqueous eluate is concentrated in vacuo and the residue recrystallized from methanol-isopropanol to yield the 5-(2,4-dimethyl-pyridinum)-methyl - 4 - amino - 2 - cyclopropylmethyl - pyrimidine chloride hydrochloride of the formula

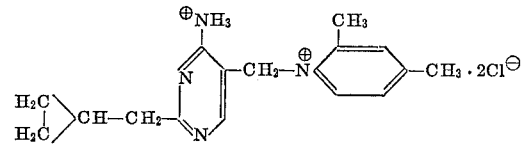

The staring material is prepared as follows:

104 g. cyclopropyl-acetonitrile are dissolved in 75 ml. anhydrous ethanol and 300 ml. diethyl ether, and through the solution anhydrous hydrogen chloride is bubbled until the uptake of 46.0 g. thereof is noted. The solid formed is filtered off after cooling and washed with anhydrous diethyl ether. The so-obtained cyclopropyl-acetic acid imino-ethylester hydrochloride is suspended in 75 ml. anhydrous ethanol and the mixture treated with 175 ml. 7.2 N ethanolic ammonia. After stirring at room temperature for 7 hours, the mixture is maintained at this temperature overnight. It is filtered, the filtrate concentrated in vacuo and the residual white crystals filtered off to yield the cyclopropyl-acetic acid amidine hydrochloride.

The solution of 118 g. thereof in 800 ml. anhydrous ethanol is added to a solution of sodium ethylate prepared from 19.9 g. sodium and 850 ml. anhydrous ethanol, whereby the temperature is maintained at −5°. The separated salt is removed by filtration and the filtrate is added dropwise within 1 hour to a stirred solution of 112.5 g. ethoxymethylidene-malodinitrile in 900 ml. anhydrous ethanol at −5° and stirring is continued for additional 2¼ hours. The product is filtered, washed with ethanol and dried in vacuo at 50° to yield the 5-cyano-4-amino-2-cyclopropylmethyl-pyrimidine.

The suspension of 18.2 g. thereof and 2.0 g. 10% palladium-charcoal in 200 ml. glacial acetic acid is saturated with anhydrous hydrogen chloride and hydrogenated at 40 p.s.i. initial pressure. Three such runs are combined, diluted with water to dissolve separated salts and filtered to remove the catalyst. The filtrate is evaporated in vacuo, to the residue water is added and the distillation is repeated 3 times to remove remaining acetic acid. Finally anhydrous ethanol is added to the residue together with 10 ml. 4 N-ethanolic hydrochloric acid and the distillation is repeated to remove traces of water. The residue is finally boiled with isopropanol and filtered to yield the 5-aminomethyl-4-amino-2-cyclopropylmethyl-pyrimidine dihydrochloride.

To a solution of 26.6 g. thereof in 400 ml. water the solution of 7.5 g. sodium nitrite in 400 ml. water is added over a 3-hour period whereby the temperature is maintained at 50–55°. The homogeneous solution is stirred for 17 hours at said temperature, then concentrated by distillation in vacuo and finally adjusted to a pH about 7.5–8 with saturated sodium carbonate solution. The yellow residue extracted with 4 portions of boiling 90% aqueous acetone, the solution concentrated to a small volume and remaining water is removed azeotropically with ethanol. The solution is filtered, the filtrate acidified to a pH of about 4 with ethanolic hydrochloric acid and then diluted with diethyl ether. After standing for a short time, the precipitated yellow solid is filtered, ground in a mortar with diethyl ether, filtered and vacuum dried at 50° to yield the 5-hydroxymethyl-4-amino-2-cyclopropylmethyl-pyrimidine hydrochloride.

The hydrochloride obtained is dissolved in the minimum amount of water and solid potassium carbonate is added while cooling and stirring until an oily layer separates. It is extracted with n-butanol until the last extract is virtually colorless. The combined extracts are dried over potassium carbonate, filtered and evaporated in vacuo. The residue is triturated with diethyl ether, filtered, washed with ether and dried in vacuo at 50° to yield the 5-hydroxymethyl-4-amino-2-cyclopropylmethyl-pyrimidine.

EXAMPLE 2

19.0 g. 5-hydroxymethyl-4-amino-2-cyclopropylmethyl-pyrimidine are dissolved in 100 ml. 2,4-lutidine with warming. Hereupon 20.4 g. p-toluenesulfonyl chloride are added portionwise while cooling, the solution is filtered and allowed to stand at −20° for 18 hours and at room temperature for 5½ days. It is then diluted with diethyl ether, the gummy solid triturated with diethyl ether and recrystallized from isopropanol-diethyl ether to yield the 5-(2,4-dimethyl-pyridinium)-methyl-4-amino-2-cyclopropylmethyl-pyrimidine salt melting at 238–239°.

40.3 g. thereof are dissolved in 300 ml. water containing 5 ml. 0.006 N hydrochloric acid, the solution is treated with charcoal, filtered and the filtrate passed through a column of Amberlite IRA–400 resin column in the chloride form. The column is washed with 500 ml. water, the combined eluates treated again with charcoal, filtered and evaporated in vacuo. To the residue isopropanol is added, which is distilled off removing the residual water azeotropically. The dried residue is suspended in acetone, the suspension filtered, the filter cake washed with acetone and recrystallized from methanol-isopropanol (1:1), to yield the 5-(2,4-dimethyl-pyridinium) - methyl - 4 - amino - 2 - cyclopropylmethyl-pyrimidine chloride hydrochloride, melting at 250.5 to 251° with decomposition; it is identical with the product obtained according to Example 1.

The starting material is prepared as follows: To the suspension of 41.1 g. lithium aluminum hydride in 300 ml. anhydrous diethyl ether, the solution of 100 g. cyclopropane carboxylic acid in 300 ml. diethyl ether is added slowly while stirring. The rate of addition is adjusted to maintain a gentle reflux of the solvent, and stirring and refluxing is continued for 8 hours. Hereupon the mixture is diluted with 500 ml. deithyl ether and 130 ml. 15% aqueous sodium hydroxide are stirred in while chilling. The mixture is filtered, the residue washed with diethyl ether, the filtrate dried, evaporated, the residue distilled and the fraction boiling at 122–126° collected. It represents the cyclopropyl-methanol having an $n_D^{25}$=1.4299.

89.1 g. thereof are dissolved in 350 ml. anhydrous diethyl ether the solution cooled to −70° and 40.8 g. phosphorus tribromide are added dropwise with stirring during ½ hour. The reaction mixture is then allowed to warm up gradually to room temperature overnight and is then treated with 12 ml. water. The organic layer is separated, washed with saturated aqueous sodium carbonate and with water, dried, evaporated and the residue distilled to yield the cyclopropylmethyl bromide boiling at 102–110°, $n_D^{25}$=1.4752.

126.5 g. thereof are added to the stirred suspension of 51.9 g. sodium cyanide in 377 ml. dimethylsulfoxide while maintaining the temperature between 55 and 60°. Hereupon the reaction mixture is kept at 70° for 2 hours, then cooled, diluted with 500 ml. water and extracted with diethyl ether. The extract is washed with water, 25 ml. 6 N hydrochloric acid, dried and evaporated. The residue is distilled and the fraction boiling at 142–147° collected; it represents the cyclopropylacetonitrile, $n_D^{25}$=1.4218.

The solution of 101 g. thereof in 61.4 g. anhydrous ethanol is gassed with hydrogen chloride until 48.3 g. thereof are consumed. After standing overnight at −20° the precipitate formed is filtered off, washed with diethyl ether and dried under reduced pressure, to yield the hygroscopic cyclopropylacetimidic acid ethyl ester hydrochloride.

To the solution of 173.1 g. thereof in 100 ml. anhydrous ethanol, 130 ml. 6.3 N ethanolic ammonia are added rapidly while stirring and cooling. The reaction mixture is allowed to stand at room temperature overnight, whereupon it is filtered, the filtrate concentrated to ½ of its volume and the concentrate chilled until crystallization occurs by scratching. The cyclopropyl-acetamidine hydrochloride formed is filtered off, washed with anhydrous diethyl ether and dried under reduced pressure.

The solution of 136.6 g. thereof in 700 ml. anhydrous ethanol is added to the solution, prepared from 23.6 g. sodium and 950 ml. anhydrous ethanol, at 15° during ½ hour while stirring. Upon addition of filter cel the mixture is filtered through a sintered glass funnel and the filtrate is added to the solution of 130 g. ethoxymethylidene-malodinitrile in 130 ml. anhydrous ethanol during 1¼ hours while chilling to −5 to −10°. The mixture is stirred for 3 hours at this temperature, then filtered, the residue washed with cold anhydrous ethanol and dried in vacuo at 50°, to yield the 5-cyano-4-amino-2-cyclopropylmethyl-pyrimidine melting at 181–182.5°.

The suspension of 17.4 g. thereof, 2.5 g. 10% pallidium charcoal and 200 ml. glacial acetic acid is saturated with anhydrous hydrogen chloride and hydrogenated at 150 p.s.i. initial pressure. The theoretical hydrogen uptake is noted after about 6 hours. The mixture is diluted with water, filtered and the filtrate evaporated in vacuo. To the residue isopropanol is added and distilled off, in order to remove water and acetic acid. Finally the residue is heated on a steam bath under vacuum for 1 hour and recrystallized from isopropanol-methanol to yield the 5-aminomethyl - 4 - amino - 2 - cyclopropylmethyl - pyrimidine dihydrochloride melting at 228.5 to 229°.

The solution of 75.8 g. thereof in 1.1 liter water is heated to 55° with stirring and the solution of 23.0 g. sodium nitrite in 1 liter water is added dropwise during 2¼ hours while stirring. The mixture is kept at 54° for 6 hours and overnight at room temperature. Hereupon it is treated with charcoal, filtered with the aid of filter cel and the filtrate concentrated to 500 ml. in vacuo. The concentrate is cooled to 5° and neutralized with saturated sodium carbonate solution to a pH 7.5–8.0. It is extracted with n-butanol, the extract dried and concentrated in vacuo until crystallization occurs. After addition of diethyl ether the mixture is filtered and the residue washed with diethyl ether to yield the 5-hydroxymethyl-4-amino-2-cyclopropylmethyl-pyrimidine melting at 143–146°.

EXAMPLE 3

18.5 g. 5-hydroxymethyl-4-amino-2-cyclopropylmethyl-pyrimidine are dissolved in 100 ml. 2-picoline and to the solution 19.9 g. p-toluenesulfonyl chloride are added. The mixture is worked up as described in Example 1 to yield the 5-(2-methyl-pyridinium)-methyl-4-amino-2-cyclopropylmethyl-pyrimidine chloride hydrochloride of the formula

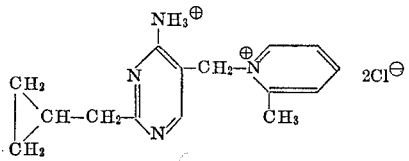

melting at 225.5 to 226.5°.

EXAMPLE 4

To the solution of 35.0 g. 5-hydroxymethyl-4-amino-2-cyclobutylmethyl-pyrimidine in 250 ml. 2,4-lutidine, 34.7 g. p-toluenesulfonyl chloride are added portionwise with stirring at room temperature. The mixture is then refrigerated at −15° for 2 days and allowed to stand at room temperature for 4 days. The precipitate formed is filtered off, washed with acetone and recrystallized twice from anhydrous ethanol to yield the 5-(2,4-dimethyl-pyridinium) - methyl - 4 - amino - 2 - cyclobutylmethyl - pyrimidine chloride hydrochloride of the formula

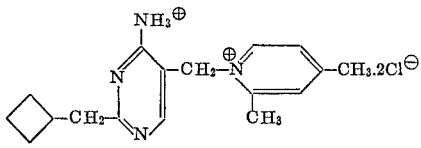

melting at 240–242°.

The starting material is prepared as follows: The solution of 50.0 g. cyclobutylcarboxylic acid in 500 ml. diethyl ether is added to the mixture of 23.6 g. lithium aluminum hydride and 500 ml. diethyl ether while stirring and refluxing. The mixture is refluxed and stirred for 3 hours, then cooled in an ice bath and 71.6 ml. 15% aqueous sodium hydroxide are added under nitrogen. The precipitate formed is filtered off, washed with diethyl ether and the filtrate evaporated. The residue is distilled and the fraction boiling at 140–143° collected; it represents the cyclobutylmethanol.

36.2 g. thereof are dissolved in 250 ml. anhydrous diethyl ether, the solution chilled to −70°, and combined with the solution of 14.8 g. phosphorus tribromide in 20 ml. diethyl ether while maintaining the temperature at −65° to −60°. The mixture is stirred for 2 hours and gradually warmed up to room temperature. Hereupon 10 ml. water are added and the organic layer separated. It is washed twice with saturated aqueous sodium carbonate and once with water, dried and evaporated. The residue is distilled and the fraction boiling at 134–136° collected; it represents the cyclobutylmethyl bromide.

28.5 g. thereof are added dropwise to the stirred mixture of 10.5 g. sodium cyanide and 76.4 g. dimethylsulfoxide at 50° within 10 minutes and the resulting mixture is kept for 2 hours at 70°. It is then cooled, 150 ml. water are added and extracted with diethyl ether. The extract is washed with cold 6 N hydrochloric acid and water, dried, filtered and evaporated. The residue is distilled and the fraction boiling at 78°/38 mm. Hg collected; it represents the cyclobutyl-acetonitrile.

To the solution of 11.6 g. thereof in 5.6 g. anhydrous ethanol, 9.9 g. anhydrous hydrogen bromide are added at −30° to −40° and the mixture is allowed to stand overnight at −15°. The crystalline material is dried in vacuo over phosphorus pentoxide to yield the cyclobutyl-acetimidic acid ethyl ester hydrobromide melting at 79–81°.

22.7 g. thereof are dissolved in 10 ml. anhydrous ethanol and the solution treated with an excess of ethanolic ammonia. The mixture is stirred overnight at room temperature, concentrated to a small volume and the precipitate formed filtered off. It is washed with diethyl ether and dried in vacuo to yield the cyclobutyl-acetamidine hydrobromide melting at 152–156°.

The solution of 18.4 g. thereof in 100 ml. anhydrous ethanol is added to the solution, prepared from 2.3 g. sodium and 100 ml. anhydrous ethanol, at 0° during ½ an hour. The mixture is stirred for ¼ of an hour in the cold, filtered and the filtrate added to the solution of 12.0 g. ethoxymethylidene-malodinitrile in 110 ml. ethanol at 0° to −5°, during ½ an hour. The mixture is stirred for 4 hours at 0°, the precipitate formed filtered off, washed with a little cold anhydrous ethanol and dried in vacuo to yield the 5-cyano-4-amino-2-cyclobutylmethyl-pyrimidine melting at 179°–181°.

The mixture of 18.8 g. thereof, 250 ml. methanol, 50 ml. liquid ammonia and 5 g. Raney nickel is hydrogenated at 3 atm. initial pressure until the theoretical hydrogen uptake is noted. It is then filtered, the filtrate evaporated, the residue dissolved in anhydrous ethanol and the solution acidified against Congo red with ethanolic hydrogen chloride. The precipitate formed is filtered off and washed with anhydrous ethanol to yield the 5-aminomethyl - 4 - amino - 2 - cyclobutylmethyl - pyrimidine dihydrochloride melting at 259–262°.

To the solution of 82.5 g. thereof in 1.1 liter water, the solution of 24.3 g. sodium nitrite in 1 liter water is added during 2 hours at 50–55° while stirring, and stirring is continued for 6 hours at this temperature. The mixture is filtered, the filtrate concentrated in vacuo and the concentrate made basic with cold saturated aqueous sodium carbonate. The precipitate formed is filtered off, washed with a little cold water, dried and recrystallized from ethyl acetate to yield the 5-hydroxymethyl-4-amino-2-cyclobutylmethyl-pyrimidine melting at 137°.

EXAMPLE 5

To the solution of 9.2 g. 5-hydroxymethyl-4-amino-2-cyclobutylmethyl-pyrimidine in 75 ml. 2-picoline, 9.1 g. p-toluenesulfonyl chloride are added with stirring at room temperature. The mixture is kept at −15° for 2 days and allowed to stand at room temperature for 4 days. The precipitate formed is filtered off, washed with acetone, dried and recrystallized from anhydrous ethanol to yield the 5 - (2 - methyl - pyridinium)-methyl-4-amino-2-cyclobutylmethyl-pyrimidine chloride hydrochloride of the formula

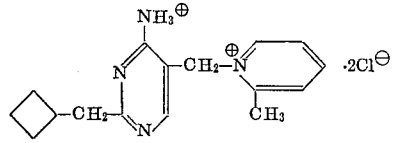

melting at 220–224°.

EXAMPLE 6

2.7 g. 5 - chloromethyl - 4-amino-2-cyclopropylmethyl-pyrimidine hydrochloride are suspended in 20 ml. 2,4-lutidine and the mixture is stirred for 4 hours on the steam bath. Hereupon it is chilled, diluted with diethyl ether, the supernatant liquid decanted and the residue boiled with isopropanol. Upon chilling the suspension is filtered, the residue washed with isopropanol and recrystallized from methanol-isopropanol to yield the 5-(2,4-dimethyl - pyridinium) - methyl - 4 - amino - 2 - cyclopropylmethyl-pyrimidine chloride hydrochloride melting at 252° with decomposition; it is identical with the product obtained according to Example 1.

The starting material is prepared as follows: To the solution of 5.8 g. 5-hydroxymethyl-4-amino-2-cyclopropylmethyl-pyrimidine in 10 ml. dimethylformamide, 2.45 ml. thionyl chloride are added dropwise while stirring and keeping the temperature below 5°. After stirring for 2 hours in the ice bath, the mixture is allowed to stand at 0° for 18 hours. Upon dilution with diethyl ether, the precipitate is filtered off, triturated with diethyl ether and acetone and recrystallized from isopropanol-diethyl ether to yield the 5-chloromethyl-4-amino-2-cyclopropylmethyl-pyrimidine hydrochloride melting at 191–195° with decomposition.

EXAMPLE 7

The mixture of 6.5 g. 5 - chloromethyl - 4 - amino - 2- cyclopropylmethyl-pyrimidine hydrochloride and 30 ml. 2,4-lutidine is heated at the steam cone for 3 hours. It is allowed to stand overnight at room temperature, then diluted with acetone and the precipitate formed filtered off. It is washed with acetone until the odor of 2,4-lutidine disappears and recrystallized from aqueous isopropanol, to yield the 5 - (2,4 - dimethyl - pyridinium)-methyl-4-amino-2-cyclopropylmethyl-pyrimidine chloride hydrochloride melting at 252–253° with decomposition; it is identical with the product shown in Example 1.

The starting material is prepared as follows: To the solution prepared from 7.6 g. sodium and 200 ml. anhydrous ethanol, 61.2 g. cyclopropyl-acetamidine hydrobromide are added while stirring at 0–10°. Stirring is continued for ½ an hour and hereupon 53.0 g. α-methoxymethylidene-β-isopropoxy proponitrile (containing about 71% of the cis-isomer) are added in one portion and the mixture is stirred for 20 hours at room temperature. The precipitate formed is filtered off, the filtrate evaporated in vacuo and the residue dissolved in methylene chloride. The solution is washed with water, the aqueous layer extracted with methylene chloride, the combined organic solutions dried, filtered and evaporated. The residue is dried in vacuo at room temperature and recrystallized from cyclohexane to yield the 5-isopropoxymethyl-4-amino-2-cyclopropylmethyl-pyrimidine melting at 107.5–108.5°.

10.0 g. thereof are dissolved in 50 ml. anhydrous ethanol and the solution refluxed while being gassed with anhydrous hydrogen chloride for 2 hours. The mixture is cooled, concentrated with hydrogen chloride and allowed to stand for 24 hours at room temperature. It is then filtered, the residue triturated with diethyl ether and recrystallized from acetone-diethyl ether to yield the 5-chloromethyl - 4 - amino - 2 - cyclopropylmethyl - pyrimidine hydrochloride melting at 183–187°.

EXAMPLE 8

2.2 g. 5 - hydroxymethyl - 4 - amino-2-(2-chloro-cyclopropyl)-methyl-pyrimidine are dissolved in 12 ml. 2,4-lutidine with warming. Hereupon 2.0 g. p-toluenesulfonyl chloride are added while cooling. The mixture is then filtered and the filtrate allowed to stand at —20° for 2 days and at room temperature for 4 days. It is then diluted with acetone, the precipitate formed filtered off, washed with acetone and recrystallized from isopropanol-diethyl ether to yield the 5-(2,4-dimethyl-pyridinium)-methyl - 4 - amino - 2 - (2 - chloro - cyclopropyl) - methyl-pyridine chloride hydrochloride of the formula

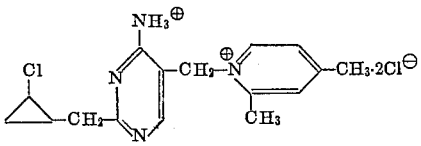

The starting material is prepared as follows: The stirred mixture of 35.64 g. phenyl-(trichloromethyl)-mercury, 21 ml. allylcyanide and 100 ml. dry benzene is refluxed for 137 hours under nitrogen. At this time the mercury compound is completely used up. The mixture is filtered, the filtrate evaporated in vacuo and the residue triturated with diethyl ether. The precipitate formed is filtered off, the residue washed with diethyl ether, the filtrate evaporated in vacuo, the residue distilled and the fraction boiling at 100–107°/11 mm. Hg collected; it represents the 2,2-dichloro-cyclopropyl-acetonitrile.

15.0 g. thereof are dissolved in 60 ml. anhydrous ethanol and through the cooled solution hydrogen chloride is bubbled until 3.7 g. thereof are consumed. After standing overnight in the refrigerator the precipitate formed is filtered off, washed with diethyl ether and dried to yield the 2,2-dichloro-cyclopropyl-acetimidic acid ethyl ester hydrochloride.

97.5 g. thereof are suspended in 75 ml. anhydrous ethanol and 100 ml. 6.3 N ethanolic ammonia are added rapidly while stirring and cooling. The reaction mixture is allowed to stand at room temperature overnight. It is filtered, the filtrate evaporated and the residue recrystallized from ethanol to yield the 2,2-dichloro-cyclopropyl-acetic acid amidine hydrochloride.

68.5 g. thereof are dissolved in 350 ml. anhydrous ethanol and the solution combined with that prepared from 2.4 g. sodium and 95 ml. anhydrous ethanol. The mixture obtained is stirred for ½ hour at room temperature, then filtered through a glass funnel and the filtrate added dropwise to the solution of 13.0 g. ethoxymethylidene-malonodinitrile in 13 ml. anhydrous ethanol while keeping the temperature below —5°. The mixture is stirred for 3 hours at this temperature, then filtered, the residue washed with a little cold ethanol and dried in vacuo to yield the 5-cyano-4-amino-2-(2,2-dichloro-cyclopropyl)-methyl-pyrimidine.

15.0 g. thereof are hydrogenated in 100 ml. 2 N ethanolic ammonia over 15.0 g. Raney nickel for 2 days at 47 p.s.i. and room temperature. The mixture is then filtered, the filtrate evaporated and the residue acidified with ethanolic hydrochloric acid. The precipitate formed is filtered off to yield the 5 - aminomethyl - 4 - amino-2-(2 - chloro-cyclopropyl)-methyl-pyrimidine dihydrochloride.

The solution of 8.6 g. thereof in 115 ml. water is heated to 55° and the solution of 2.3 g. sodium nitrite in 100 ml. water is added drop-wise while stirring. The mixture is kept at this temperature for 6 hours and stirred overnight at room temperature. Hereupon it is treated with charcoal, filtered and the filtrate concentrated to about 50 ml. in vacuo. The concentrate is cooled, neutralized with saturated aqueous sodium carbonate and extracted with n-butanol. The extract is dried and evaporated in vacuo. The residue is triturated with diethyl ether and the precipitate formed filtered off to yield the 5-hydroxymethyl-4-amino-2-(2-chloro-cyclopropyl)-methyl-pyrimidine.

EXAMPLE 9

In the manner described in the previous examples, the following compounds are prepared by using the equivalent amounts of the corresponding starting materials:

5-quinoliniummethyl-4-amino-2-cyclopropylmethyl-pyrimidine,
5-isoquinoliniummethyl-4-amino-2-cyclopentylmethyl-pyrimidine,
5-pyridaziniummethyl-4-amino-2-cyclopentylmethyl-pyrimidine,
5-pyrimidiniummethyl-4-amino-2-cyclohexylmethyl-pyrimidine,
5-pyraziniummethyl-4-amino-2-cyclopentylmethyl-pyrimidine,
5-thiazoliniummethyl-4-amino-2-(2-cyclopentyl)-methyl-pyrimidine,
5-oxazoliniummethyl-4-amino-2-(2-cyclopropylethyl)-pyrimidine,
5-(5,6-dimethoxy-quinolinium)-methyl-4-amino-2-cyclobutylmethyl-pyrimidine,
5-quinaldiniummethyl-4-amino-2-cyclohexylmethyl-pyrimidine,
5-lepidiniummethyl-4-amino-(2-cyclopentenyl)-methyl-pyrimidine,
5-(1-methyl-isoquinolinium)-methyl-4-amino-2-(2-cyclohexenyl)-methyl-pyrimidine,
5-(2,6-dimethyl-4-methoxy-pyridinium)-methyl-4-amino-2-cyclopentylmethyl-pyrimidine,
5-(2,4-dimethyl-oxazolinium)-methyl-4-amino-2-cyclopropylmethyl-pyrimidine,
5-(3-chloro-pyridinium)-methyl-4-amino-2-(1-cyclopropylethyl)-pyrimidine, 5-(3-dimethylamino-pyridinium)-methyl-4-amino-2-cyclopentylmethyl-pyrimidine
and the 2 - (2 - methyl-cyclopropylmethyl-, 2-(2,3-dimethyl-cyclopropylmethyl-, 2 - (2 - methoxy-cyclopropylmethyl)-, 2- (2,2,3 - trimethyl - cyclobutyl)-methyl-, 2-cyclopentylmethyl-, 2 - (2 - cyclopropyl-ethyl)- and 2-(2-cyclopropenylmethyl) - 4 - amino - 5 - (2 - methyl- or 2,4 - dimethyl-pyridinium)-methyl-pyrimidine salts, particularly the corresponding chloride hydrochlorides.

EXAMPLE 10

9.70 g. 5 - hydroxymethyl - 4 - amino - 2 - cyclopentyl-pyrimidine are dissolved in 50 ml. 2,4-lutidine and to the solution 9.73 g. powdered p-toluenesulfonyl chloride are added at room temperature and the mixture is allowed to stand to 2 days at —15° and at room temperature for 5 days. It is filtered, the residue washed with isopropanol and recrystallized from methanol-isopropanol to yield the 5 - (2,4 - dimethyl-pyridinium) - methyl - 4 - amino-2-cyclopentyl-pyrimidine chloride hydrochloride of the formula

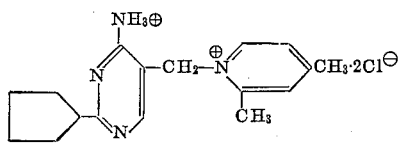

melting at 254–255°.

The starting material is prepared as follows: To the suspension of 55 g. sodium cyanide in 265 ml. dimethyl-sulfoxide, 105 g. cyclopentyl chloride are added at 110–115° while stirring. The mixture is maintained at about 125° for 3 hours, then cooled and diluted to 1 liter with water. The mixture is extracted with methylene chloride, the extract washed with 6 N hydrochloric acid and water, dried, filtered and evaporated. The residue is distilled twice and the fraction boiling at 63°/15 mm. Hg collected; it represents the cyclopentyl cyanide.

To the mixture of 18.0 g. thereof and 9.2 g. anhydrous ethanol, 16.2 g. anhydrous hydrogen bromide are added at —20° and the mixture is allowed to stand overnight at —15°. The precipitate formed is filtered off, washed with a little diethyl ether, and dried in vacuo to yield the cyclopentyl-formimidic acid ethyl ester hydrobromide melting at 82–83°.

To the solution of 153.6 g. thereof in 120 ml. anhydrous ethanol, saturated ethanolic ammonia is added so that an excess of ammonia is present. The mixture is stirred for 18 hours at room temperature, concentrated in vacuo and the concentrate chilled to yield the cyclopentyl-formamidine hydrobromide melting at 148°.

The solution of 103.5 g. thereof in 250 ml. anhydrous ethanol is added to the solution, prepared from 12.3 g. sodium and 500 ml. anhydrous ethanol, at 0 to —5° during ½ an hour. The mixture is stirred for another ¼ of an hour, then filtered and the filtrate added to the solution of 65.4 g. ethoxymethylidenemalodinitrile during 1½ hours at 0 to —5°. The reaction mixture is stirred for 3 hours at that temperature, then filtered and the residue washed with a little ethanol. It is dried in vacuo and recrystallized from isopropanol to yield the 5-cyano-4-amino-2-cyclopentyl-pyrimidine melting at 161–162°.

The mixture of 18.8 g. thereof, 2.0 g. 10% palladium charcoal and 250 ml. 3 N hydrochloric acid is hydrogenated at 48 p.s.i. initial pressure until 2 mol equivalents hydrogen are consumed. In the course of the reduction, the corresponding intermediate Schiff's base is formed, which is hydrolyzed to the corresponding aldehyde, which then is reduced to the hydroxymethyl compound. The mixture is filtered, the filtrate evaporated and traces of water are removed azeotropically with isopropanol and the resultant ammonium chloride is filtered off as formed in order to eliminate bumping. The residue is recrystallized twice from isopropanol to yield the 5-hydroxy-methyl - 4 - amino-2-cyclopentyl-pyrimidine hydrochloride melting at 110–111°.

20.2 g. thereof are dissolved in the minimum amount of water and the solution made basic with saturated aqueous potassium carbonate. The mixture is extracted with n-butanol to yield the corresponding base melting at 101–104°.

EXAMPLE 11

2.2 g. 5 - hydroxymethyl-4-amino-2-cyclopentyl-pyrimidine are dissolved in 12 ml. redistilled 2-picoline and to the solution 2.15 g. p-toluenesulfonyl chloride are added while stirring. The reaction mixture is allowed to stand at room temperature for 36 hours. It is then diluted with diethyl ether whereby a gummy solid separates, which becomes crystalline on scratching. The excess picoline is removed by decanting the supernatant liquid, redissolving the solid in isopropanol and reprecipitating it 4 times with diethyl ether. It is finally dissolved in 100 ml. 0.06 N hydrochloric acid and the solution is passed through Amberlite IRA–400 in the chloride form. The eluate is concentrated at the stream bath yielding the 5-(2-methyl-pyridinium)-methyl - 4 - amino - 2-cyclopentyl-pyrimidine chloride hydrochloride of the formula

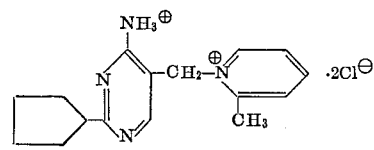

EXAMPLE 12

The mixture of 3.0 g. 5-chloromethyl-4-amino-2-cyclopropyl-pyrimidine hydrochloride and 20 ml. 2,4-lutidine is heated at the steam cone until a solid precipitate is formed. It is ground in a mortar and further heated with the supernatant solution for additional 3 hours. The mixture is then cooled, filtered and the residue washed with diethyl ether. It is recrystallized from isopropanol to yield the 5-(2,4-dimethyl-pyridinium)-methyl-4-amino-2-cyclopropyl-pyrimidine chloride hydrochloride of the formula

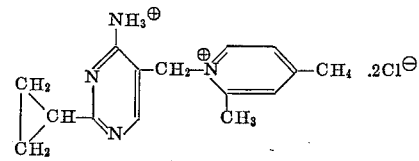

melting at 232 to 233°.

The starting material is prepared as follows: To the solution of 50 g. cyclopropyl-cyanide in 44 ml. ethanol and 75 ml. toluene, cooled to —5°, 60 g. anhydrous hydrogen bromide are bubbled in and the mixture is kept in the freezer overnight at +5°. It is then cooled in an ice bath and 195 ml. of 10% ethanolic ammonia are added while stirring and the mixture is then stirred for 4 hours at room temperature. It is filtered cold and the residue washed with ethanol-benzene (1:1), to yield the cyclopropyl-formamidine hydrobromide melting at 125–128°.

17.3 g. thereof are added to the stirred solution, prepared from 2.3 g. sodium and 150 ml. ethanol, kept under nitrogen. The mixture is stirred for ½ an hour, filtered and the filtrate added during 1 hour to the solution of 12.2 g. ethoxymethylene-malodinitrile (M.P. 67–68°) in 100 ml. anhydrous ethanol at room temperature while stirring. The mixture is stirred at room temperature overnight, then cooled and filtered to yield the 5-cyano-4-amino-2-cyclopropyl-pyrimidine melting at 188–190°.

The suspension of 18 g. thereof in 900 ml. 1.46 molar methanolic ammonia, containing 2 teaspoons of Raney nickel, is hydrogenated at 48 p.s.i. at room temperature. After 13 hours about 85% of the theoretical amount of hydrogen is absorbed. The mixture is then filtered, the filtrate evaporated and the residue dissolved in 55 ml. ethanol. The solution is combined with 90 ml. 10% ethanolic hydrochloric acid, cooled in an ice bath and the precipitate formed filtered off to yield the 5-aminomethyl-4-amino-2-cyclopropyl-pyrimidine dihydrochloride melting at 170–171°.

To the solution of 15 g. thereof in 230 ml. water, kept at 54–55°, 200 ml. of the aqueous solution of 4.58 g. sodium nitrite are added during 4 hours while stirring. The mixture is stirred for 2 more hours at this temperature and at room temperature overnight. It is then acidified with hydrochloric acid to a pH of about 3, charcoal is added and filtered. The filtrate is made basic with sodium carbonate and extracted with n-butanol. The extract is washed with water and evaporated, while azeotropically dried with toluene. The residue is triturated with diethyl ether and filtered off to yield the 5-hydroxymethyl-4-amino-2-cyclopropyl-pyrimidine melting at 158 to 162°.

The mixture of 4.77 g. thereof, 25 ml. dimethylformamide and 3.62 g. thionyl chloride is kept for 1 hour at 0° and overnight at room temperature. Hereupon diethyl ether is added, the precipitate formed filtered off, triturated with acetone and dried to yield the 5-chloromethyl-4-amino-2-cyclopropyl-pyrimidine hydrochloride melting at 186–187°.

EXAMPLE 13

The mixture of 2.63 g. 5-chloromethyl-4-amino-2-cyclopropyl-pyrimidine hydrochloride and 20 ml. α-picoline is heated at the steam cone for 3 hours. The residue formed is ground in a mortar, filtered off, washed with diethyl ether and triturated with 25 ml. hot isopropanol, to yield the 5-(2-methylpyridinium)-methyl-4-amino-2-cyclopropyl-pyrimidine chloride hydrochloride of the formula

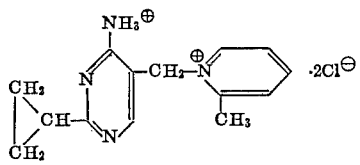

melting at 227–228°.

EXAMPLE 14

The mixture of 17.5 g. 5-isopropoxymethyl-4-amino-2-cyclopropylmethyl-pyrimidine, 25 ml. 2,4-lutidine and 200 ml. xylene is saturated with anhydrous hydrogenchloride, whereby the temperature rises to 90° and an oily layer separates. It is then refluxed for 4 hours while stirring. After cooling the precipitate formed is filtered off, triturated with hot isopropanol and recrystallized from methanol-ethanol, to yield the 5-(2,4-dimethylpyridinium)-methyl-4-amino-2-cyclopropylmethyl-pyrimidine chloride hydrochloride, which is identical with the product obtained according to Example 1 or 7; M.P. 250–252° (dec.).

EXAMPLE 15

In the manner described in the previous examples, the following compounds are prepared by using the equivalent amounts of the corresponding starting materials:

5-(2-methyl-5-ethylpyridinium)-methyl-4-amino-2-cyclopentyl-pyrimidine,
5-(4-methylpyridazinium)-methyl-4-amino-2-cyclopentyl-pyrimidine,
5-(4-methyl-5-ethyl-thiazolinium) methyl-4-amino-2-cyclopentyl-pyrimidine,
5-quinoliniummethyl-4-amino-2-cyclopropyl-pyrimidine,
5-isoquinoliniummethyl-4-amino-2-cyclopentyl-pyrimidine,
5-pyridaziniummethyl-4-amino-2-cyclopentyl-pyrimidine,
5-pyrimidiniummethyl-4-amino-2-cyclohexyl-pyrimidine,
5-pyraziniummethyl-4-amino-2-cyclopentyl-pyrimidine,
5-thiazoliniummethyl-4-amino-2-(2-cyclopentenyl)-pyrimidine,
5-oxazoliniummethyl-4-amino-2-cyclopropyl-pyrimidine,
5-(5,6-dimethoxy-quinolinum)-methyl-4-amino-2-cyclobutyl-pyrimidine,
5-quinaldiniummethyl-4-amino-2-cyclohexyl-pyrimidine,
5-lepidiniummethyl-4-amino-2-(2-cyclopentenyl)-pyrimidine,
5-(1-methyl-isoquinolinium)-methyl-4-amino-2-(2-cyclohexenyl)-pyrimidine,
5-(2,6-dimethyl-4-methoxy-pyridinium)-methyl-4-amino-2-cyclopentyl-pyrimidine,
5-(2,4-dimethyl-oxazolinium)-methyl-4-amino-2-cyclopropyl-pyrimidine,
5-(3-chloro-pyridinium)-methyl-4-amino-2-cyclopropyl-pyrimidine, or
5-(3-dimethylamino-pyridinium)-methyl-4-amino-2-cyclopentyl-pyrimidine and the 2-(2-methyl-cyclopropyl)-, 2-(1-methyl-cyclopropyl)-, 2-(2,3-dimethyl-cyclopropyl)-, 2-(2-methoxy-cyclopropyl)-, 2-cyclobutyl-, 2-(3-cyclopentyl)- and 2-(2-cyclopropenyl)-4-amino-5-(2-methyl- or 2,4-dimethyl-pyridinium)-methyl-pyrimidine salts, particularly the chloride hydrochlorides.

EXAMPLE 16

Additive for drinking water:

|  | G. |
|---|---|
| 5 - (2,4 - dimethyl - pyridinum)-methyl-4-amino-2-cyclopropylmethyl-pyrimidine chloride hydrochloride | 30.00 |
| Tetrasodium ethylenediamine-tetracetic acid | 30.00 |
| Citric acid | 70.00 |
| Sodium citrate | 50.00 |
| Confectioners' sugar | 120.00 |

An aqueous solution containing 0.01% of the active ingredient may be prepared from said additive.

EXAMPLE 17

A poultry feed containing 0.0005% of the active ingredient is prepared as follows.

Active ingredient:

| 5 - (2,4 - dimethyl - pyridinium) - methyl-4 - amino-2-cyclopropylmethyl-pyrimidine chloride hydrochloride | gram | 5.0 |
|---|---|---|

Feed formula:

| Corn meal | pounds | 1103.0 |
|---|---|---|
| Soybean meal, 44% protein | do | 660.0 |
| Alfalfa meal | do | 30.0 |
| Dicalcium phosphate | do | 40.0 |
| Limestone meal | do | 10.0 |
| Salt | do | 5.0 |
| Fish meal, 60% protein | do | 40.0 |
| Stabilized fat | do | 60.0 |
| Dried whey | do | 40.0 |
| Manganese sulfate | do | 0.5 |
| Zinc oxide | do | 0.3 |
| d,l-methionine | do | 1.5 |
| Vitamin premix | do | 10.0 |
| Total pounds | | 2000.3 |

10 lb. of the vitamin composition contain: 16,000,000 I.U. vit. A, 1,000,000 I.U. vit. $D_3$, 5,000 I.U. vit. E acetate, 6 g. vit. $K_3$, 6 mg. vit. $B_{12}$, 3 g. riboflavin, 30 g. niacin, 5 g. calcium pantothenate and 100 g. ethoxyquin, made up to 10 lb. with corn meal.

The 5 - (2,4 - dimethyl-pyridinium)-methyl-4-amino-2-cyclopropylmethyl-pyrimidine chloride hydrochloride is first premixed with about 1 kg. of the finely ground feed mixture (which is supplied as such by the manufacturer). The premix is increased to about 25 kg. with the feed and then thoroughly mixed with the main batch in a horizontal mixer.

EXAMPLE 18

A poultry feed containing 0.005% of the active ingredient is prepared as follows.

Premix:  G.
5 - (2,4 - dimethyl - pyridinium - methyl - 4- amino- 2 - cyclopropylmethyl-pyrimidine chloride hydrochloride _____ 5.00
Wheat standard middlings _____ 9,995.00

The ingredients are mixed thoroughly until uniformity is obtained.

Feed formula:  Grams
Corn meal _____ 1,062.875
Fat _____ 80.000
Fish meal, 60% protein _____ 100.000
Soybean meal, 50% protein _____ 500.000
Corn gluten meal _____ 100.000
Dehydrated alfalfa meal _____ 50.000
Corn distillers' solubles _____ 40.000
Di-calcium phosphate _____ 28.000
Calcium carbonate _____ 20.000
Iodized salt _____ 10.000
Vitamins A and D (1,000,000 int. units A units A and 250,000 D/pound) _____ 4.000
Calcium pantothenate _____ 0.250
Butylated hydroxytoluene _____ 0.250
Choline chloride, 25% _____ 2.500
Riboflavin conc. (24 g. per pound) _____ 0.125
Vitamin $B_{12}$ (0.02 g. per pound) _____ 1.000
Methionine _____ 0.500
Manganese sulfate _____ 0.500

Total weight _____ 2,000.000

The feed formula is prepared as follows: A portion of the corn meal is introduced into the blending machine (about half of the amount to be added). The remaining corn meal, previously blended with the pre-heated, liquified fat, is added thereto and mixing is continued until uniformity is obtained. The manganese sulfate, di-calcium phosphate, calcium carbonate and iodized salt are then added with mixing, followed by the addition of the fish, soybean, corn gluten and alfalfa meal and the corn distiller solubles. After a uniform mixtureh as been obtained, vitamins A and D, calcium pantothenate, choline chloride, riboflavin, vitamin $B_{12}$ and methionine are added in that order. Mixing is continued after the addition of butylated hydroxytoluene, and maintained until a uniform product is obtained.

The premix is added to the feed formula prepared as described above in an amount sufficient to provide a concentration of 0.005 g. of the active ingredient per 100 g. of feed in the uniformly blended mix.

Another premix, which can be used with the above feed formula or that of Example 17, is the following:

G.
(I) 5-(2 - methyl-pyridinium)-methyl-4-amino-2-cyclopentyl-pyrimidine chloride hydrochloride _ 23.00
(II) Confectioner's sugar _____ 100.00
(III) Solvent extracted soybean meal _____ 877.00

The ingredient I can be replaced by the same amount of the active compounds described in Examples 3, 4, 5, 10, 12 and 13.

EXAMPLE 19

A poultry feed, containing 0.003% each of two active ingredients, is prepared as follows.

Premix:  G.
(I) 5-(2,3 - dimethyl-pyridinium)-methyl-4-amino - 2 - cyclopropylmethyl-pyrimidine chloride hydrochloride _____ 3.0
(I) N'-(6-chloro - 2 - pyrazinyl)-sulfanilamide _____ 3.0
(III) Wheat standard middlings (30–80 mesh) _____ 9,994.0

The thoroughly mixed ingredients are added to 99 kg. of the feed formula shown in Example 17 and the whole is homogenized in a horizontal mixer.

EXAMPLE 20

A poultry feed, containing 0.0125 and 0.005% each of two active ingredients, is prepared as follows.

Premix:  G.
(I) 5-(2,4 - dimethyl - pyridinium)-methyl-4-amino - 2 - cyclopropylmethyl - pyrimidine chloride hydrochloride _____ 125.0
(II) N'-(6 - chloro - 2 - pyrazinyl)-sulfanilamide _____ 50.0
(III) Confectioner's sugar _____ 50.0
(IV) Soybean feed, solvent extracted _____ 275.0

The premix is prepared by triturating I and II with III and the mixture is then screened through a 30 mesh screen, U.S. standard sieve size. The screened material is then blended with IV in a mixer, the thoroughly mixed ingredients are added to 999.5 kg. of the feed formula shown in Example 17 and the whole is homogenized in a horizontal mixer.

EXAMPLE 21

A poultry feed is prepared as follows.

Premix:  G.
(I) 5-(2,4 - dimethyl - pyridinium)-methyl-4-amino - 2 - cyclopropyl-pyrimidine chloride hydrochloride _____ 105.0
(II) N'-(6-chloro - 2 - pyrazinyl) sulfanilamide _____ 34.0
(III) Soybean oil _____ 18.0
(IV) Corn gluten feed _____ 298.0

About one-third of the amount of IV is combined with I and II, mixed and then screened through a 30 mesh screen, U.S. standard sieve. The remainder of IV is then put into a mixer, III is added and the materials mixed to form a uniform dispersion to which the screened material is added and then mixed until uniformity is obtained. The resulting mixture is then added to 910 kg. of the feed formula shown in Example 17 and the whole is homogenized in a horizontal mixer.

EXAMPLE 22

A poultry feed is prepared as follows.

Premix:  G.
(I) 5-(2,4 - dimethyl - pyridinium)-methyl-4-amino - 2 - cyclopropylmethyl - pyrimidine chloride hydrochloride _____ 155.0
(II) N'(2-quinoxalinyl)-sulfanilamide _____ 125.0
(III) Confectioner's sugar _____ 150.0
(IV) Soybean feed, solvent extracted _____ 570.0

The premix is prepared by triturating I and II with III and the mixture is then screened through a 30 mesh screen, U.S. standard sieve size; the screened material is then blended with IV in a mixer and the thoroughly mixed ingredients are added to 9999 kg. of the feed formula shown in Example 17 and the whole is homogenized in a horizontal mixer.

The above examples may otherwise be modified so as to obtain a poultry feed containing about 0.001 to 0.02% of the quaternary component shown in Examples 1 to 15 alone or in admixture with another therapeutic agent, e.g., a sulfonamide, which may be present in an amount between about 0.001 and 0.01%, for the intended purposes. In preparing the premix materials (or feedstuff additives respectively) in the above-identified examples one may, of course, substitute an equivalent amount of other carriers or nutrients respectively, such as cottonseed meal, linseed meal, oatmeal and the like.

We claim:

1. A member selected from the group consisting of the compound having the formula

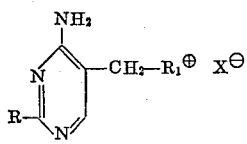

in which R is a member selected from the group consisting of 3 to 8 ring-membered cycloalkyl, cycloalkenyl and any such radical substituted by a member selected from the group consisting of lower alkyl, halogen, lower alkoxy and lower alkymercapto, $R_1^\oplus$ is pyridinium di-substituted by a member selected from the group consisting of lower alkyl, hydroxy, lower alkoxy, mercapto, lower alkylmercapto, halogen, trifluoromethyl and di-lower alkylamino, and $X^\ominus$ is the anion of a therapeutically useful acid, and a therapeutically useful acid addition salt thereof.

2. A compound as claimed in claim 1 and being a member selected from the group consisting of the compound having the formula

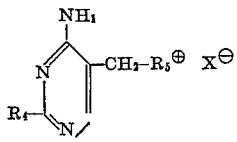

in which $R_4$ is a member selected from the group consisting of 3 to 6 ring-membered cycloalkyl, (lower alkyl)-cycloalkyl, (lower alkoxy)-cycloalkyl and (halo)-cycloalkyl, $R_5^\oplus$ is pyridinium di-substituted by lower alkyl, and $X^\ominus$ is the anion of a therapeutically useful acid, and a therapeutically useful acid addition salt thereof.

3. A compound as claimed in claim 1 and being a member selected from the group consisting of the compound having the formula

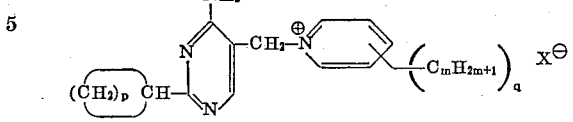

in which $p$ is an integer from 2 to 5, $m$ is an integer from 1 to 4, $q$ is 2, and $X^\ominus$ is the anion of a therapeutically useful acid, and a therapeutically useful acid addition salt thereof.

4. A compound as claimed in claim 1 and being a therapeutically useful 5-(2,4-dimethyl-pyridinium)-methyl-4-amino-2-cyclopropyl-pyrimidine salt.

5. 5-(2,4-dimethyl-pyridinium) - methyl - 4 - amino - 2-cyclopropyl-pyrimidine chloride hydrochloride.

6. A compound as claimed in claim 1 and being a therapeutically useful 5-(2,4-dimethyl-pyridinium)-methyl-4-amino-2-cyclopentyl-pyrimidine salt.

7. 5-(2,4-dimethyl-pyridinium) - methyl - 4 - amino - 2-cyclopentyl-pyrimidine chloride hydrochloride.

References Cited

UNITED STATES PATENTS 3,385,857   5/1968   Mizzoni et al. _____ 26—256.4

ALEX MAZEL, Primary Examiner.

R. J. GALLAGHER, Assistant Examiner.

U.S. Cl. X.R.

260—256.5; 424—232, 251